United States Patent [19]
Matsumoto

[11] Patent Number: 6,073,323
[45] Date of Patent: Jun. 13, 2000

[54] TOOL SPINDLE FIXING DEVICE FOR COMPOSITE MACHINE TOOL

[75] Inventor: Kazuhiko Matsumoto, Yamatokoriyama, Japan

[73] Assignee: Mori Seiki Co., Ltd., Yamatokoriyama, Japan

[21] Appl. No.: 09/099,879

[22] Filed: Jun. 19, 1998

[30] Foreign Application Priority Data

Jun. 20, 1997 [JP] Japan ..................................... 9-164006

[51] Int. Cl.$^7$ ..................................................... B23B 7/00
[52] U.S. Cl. ........................... 29/27 C; 29/27 C; 409/144
[58] Field of Search .............................. 409/144; 29/27 A, 29/27 C

[56] References Cited

U.S. PATENT DOCUMENTS

| | | | |
|---|---|---|---|
| 2,957,393 | 10/1960 | Kampmeier | 409/231 |
| 3,397,614 | 8/1968 | Meinke | 409/231 |
| 3,851,364 | 12/1974 | Noa | 409/231 |
| 4,570,313 | 2/1986 | Holmstrom | 409/144 |
| 4,599,023 | 7/1986 | Poincenot | 409/231 |
| 4,643,623 | 2/1987 | Kondo | 409/232 |
| 4,777,713 | 10/1988 | Kitamura | 29/27 C |
| 4,856,153 | 8/1989 | Gusching | 29/27 A |
| 5,385,436 | 1/1995 | Corsi | 409/230 |

*Primary Examiner*—Daniel W. Howell
*Assistant Examiner*—Daniel Phan
*Attorney, Agent, or Firm*—Oblon, Spivak, McClelland, Maier & Neustadt, P.C.

[57] ABSTRACT

A tool spindle fixing device of a composite machine tool in which a rotating-tool process is performed by driving a tool spindle into rotation with a rotating tool fitted to the tool spindle rotatably supported to a tool headstock, or in which turning process is performed by driving a work into turning with the tool spindle fixed to the tool headstock and with a turning tool fitted to the tool spindle, characterized in that: a fixed-side coupling having numerous engaging teeth is fixed to the tool headstock, a rotating-side coupling having numerous engaging teeth is fixed to the tool spindle so that the rotating-side coupling is placed within the fixed-side coupling and coaxial with the fixed-side coupling and moreover that the engaging teeth of the two couplings lie in substantially the same plane, and that a connection coupling having numerous engaging teeth is provided on the tool-headstock 12 side so as to be advanceable toward and retreatable from the fixed-side, rotating-side couplings wherein the engaging teeth of the connection coupling 25 are engaged or disengaged with the engaging teeth of both fixed-side and rotating-side couplings by which the tool spindle is fixed or unfixed to the tool headstock.

2 Claims, 4 Drawing Sheets

TOOL SPINDLE FIXING DEVICE FOR COMPOSITE MACHINE TOOL

BACKGROUND OF THE INVENTION

The present invention relates to composite machine tools capable of performing both turning process and rotating-tool process with one tool spindle. More particularly, the invention relates to a tool spindle fixing device for fixing the tool spindle to the tool headstock for the turning process.

There have been available hitherto composite machine tools, such as composite lathes, in which with a rotating tool fitted to a tool spindle rotatably supported to a tool headstock, boring, milling or other rotating-tool process can be achieved by driving the tool spindle into rotation, and in which with the tool spindle fixed to the tool headstock and with a turning tool fitted to the tool spindle, turning process can be achieved by driving a workpiece into turning.

In this type of composite machine tool, there is a need for a tool spindle fixing device which is enabled to securely fix the tool spindle to the tool headstock and to easily undo the fixing. As such a tool spindle fixing device, there has conventionally been provided one in which clamping recess portions are provided at 0° and 180° positions on the outer peripheral surface of the tool spindle and the tool spindle is fixed to the tool headstock by inserting a lock rod in the recess portion with oil pressure (see Japanese Patent Publication HEI 7-49164).

However, in the conventional method in which the lock rod is inserted into the recess portion of the outer circumferential surface of the tool spindle, the tool spindle could not be given sufficient clamping rigidity, and this insufficient rigidity would adversely affect particularly deep cutting processes, and also adversely affect the finished surface roughness and the like in the finish process, as problems. Further, the method is not enough satisfactory also in terms of the positioning accuracy in the rotational direction of the tool spindle.

SUMMARY OF THE INVENTION

The present invention having been accomplished in view of the above problems of the prior art, an object of the invention is to provide a tool spindle fixing device for composite machine tools capable of improving the clamping rigidity of the tool spindle as well as the positioning accuracy of the tool spindle in its rotational direction.

In a first aspect of the present invention, there is provided a tool spindle fixing device for composite machine tools in which a rotating-tool process is performed by driving a tool spindle into rotation with a rotating tool fitted to the tool spindle rotatably supported to a tool headstock, or in which a turning process is performed by driving a work into turning with the tool spindle fixed to the tool headstock and with a turning tool fitted to the tool spindle, characterized in that: a fixed-side coupling having numerous engaging teeth is fixed to the tool headstock, a rotating-side coupling having numerous engaging teeth is fixed to the tool spindle so that the rotating-side coupling is placed within the fixed-side coupling and coaxial with the fixed-side coupling and moreover that the engaging teeth of the two couplings form the same plane, and that: a connection coupling having numerous engaging teeth is provided on the tool-headstock side so as to be advanceable toward and retreatable from the fixed-side, rotating-side couplings, wherein the engaging teeth of the connection coupling are engaged or disengaged with the engaging teeth of both fixed-side and rotating-side couplings, by which the tool spindle is fixed or unfixed to the tool headstock.

In a second aspect of the present invention, there is provided a tool spindle fixing device for composite machine tools as described in the first aspect, further comprising a positioning mechanism in which, for the turning process, a counter-tool side end face of the tool spindle is pressed by a pressing member so that the tool spindle is positioned axially, and for rotating-tool process, the pressing member is withdrawn so as to separate from the end face.

With the tool spindle fixing device for composite machine tools according to the first aspect of the invention, since a connection coupling is engaged with both the fixed-side coupling fixed to the tool headstock and the rotating-side coupling fixed to the tool spindle, the fixed-side and rotating-side couplings are coupled with each other by engagement of numerous engaging teeth. Therefore, the clamping force of the tool spindle to the tool headstock can be greatly improved, and moreover the clamping position accuracy of the tool spindle in its rotational direction can be greatly improved.

According to the second aspect of the invention, since the counter-tool side end face of the tool spindle is pressed by the pressing member for the turning process, the rotating-side coupling is sandwiched by the connection coupling and the tool spindle so that the tool spindle can be securely fixed to the tool headstock. Thus, the tool spindle can be prevented from retreating due to the pressing force involved in the engagement of the connection coupling or due to cutting loads involved in deep cutting. This produces the effect that the finishing accuracy for finishing process can be improved.

Also, since the counter-tool side end face of the tool spindle is pressed by a pressing member, the pressing force of the connection coupling can be prevented from acting on the bearings of the tool spindle. Thus, the bearings can be prevented from shortening in service life, as a further effect.

DESCRIPTION OF THE PREFERRED EMBODIMENTS

An embodiment of the present invention is now described with reference to the accompanying drawings.

Figure 1:
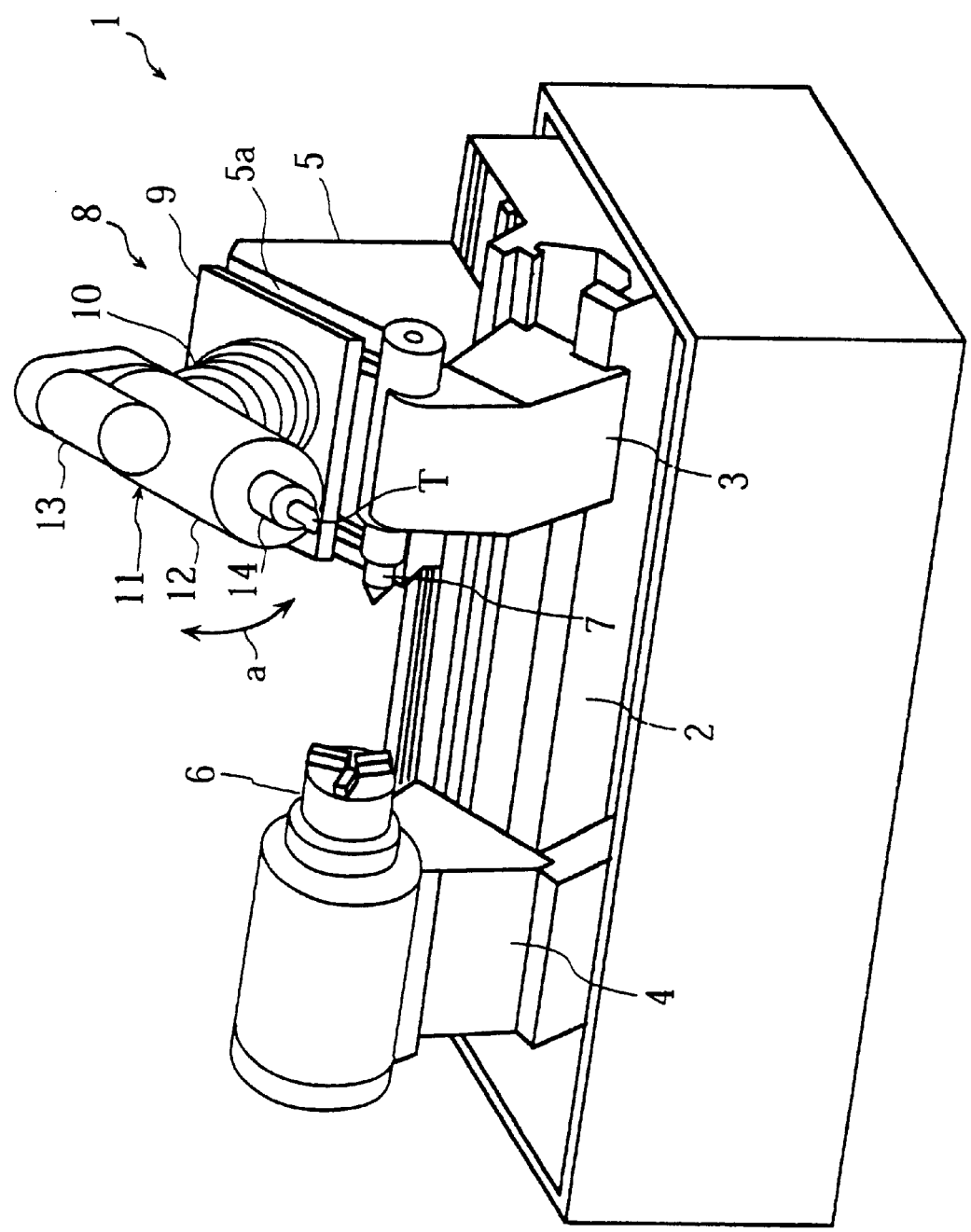
FIG. 1 is a perspective view of a composite lathe equipped with a tool spindle fixing device according to an embodiment of the present invention.
Figure 2:
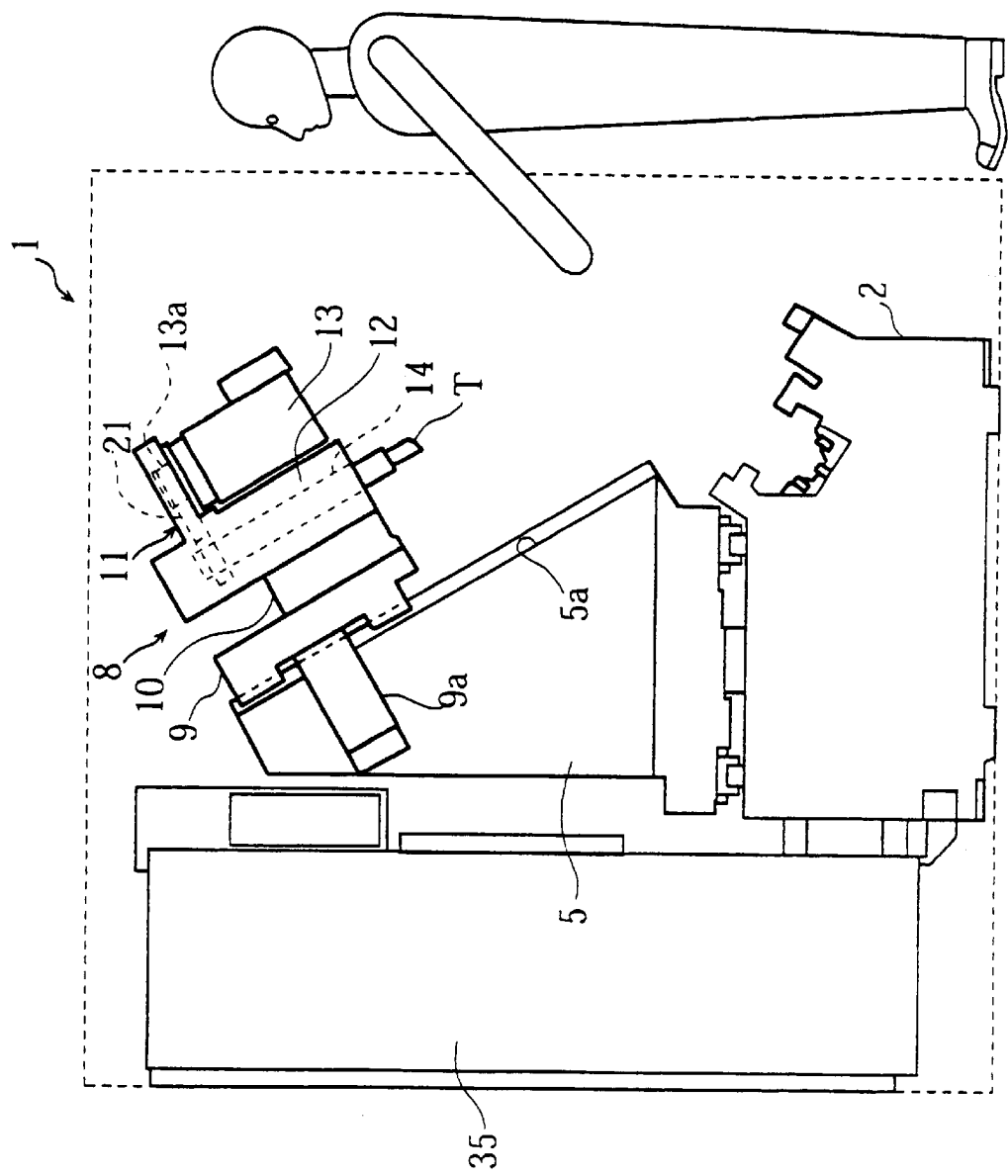
FIG. 2 is a left side view of the composite lathe.
Figure 3:
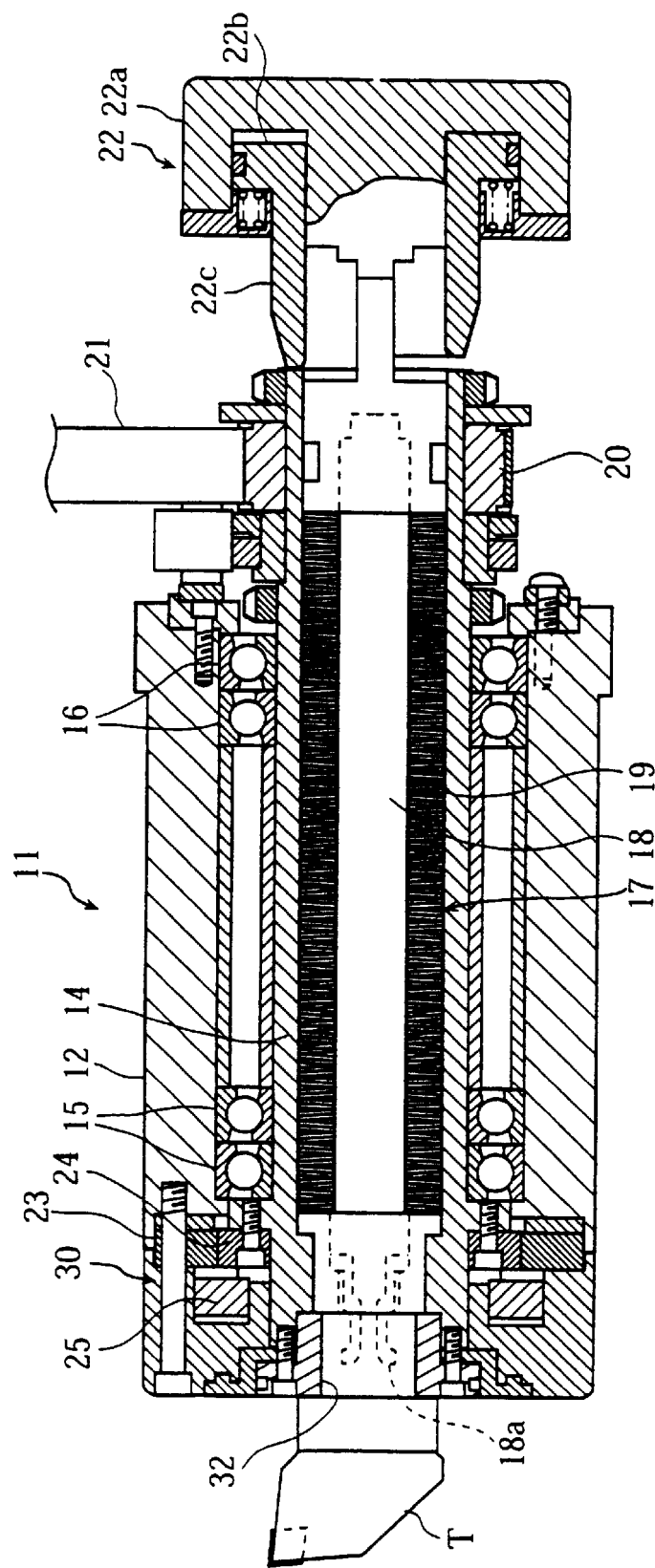
FIG. 3 is a sectional side view of the tool spindle fixing device.
Figure 4:
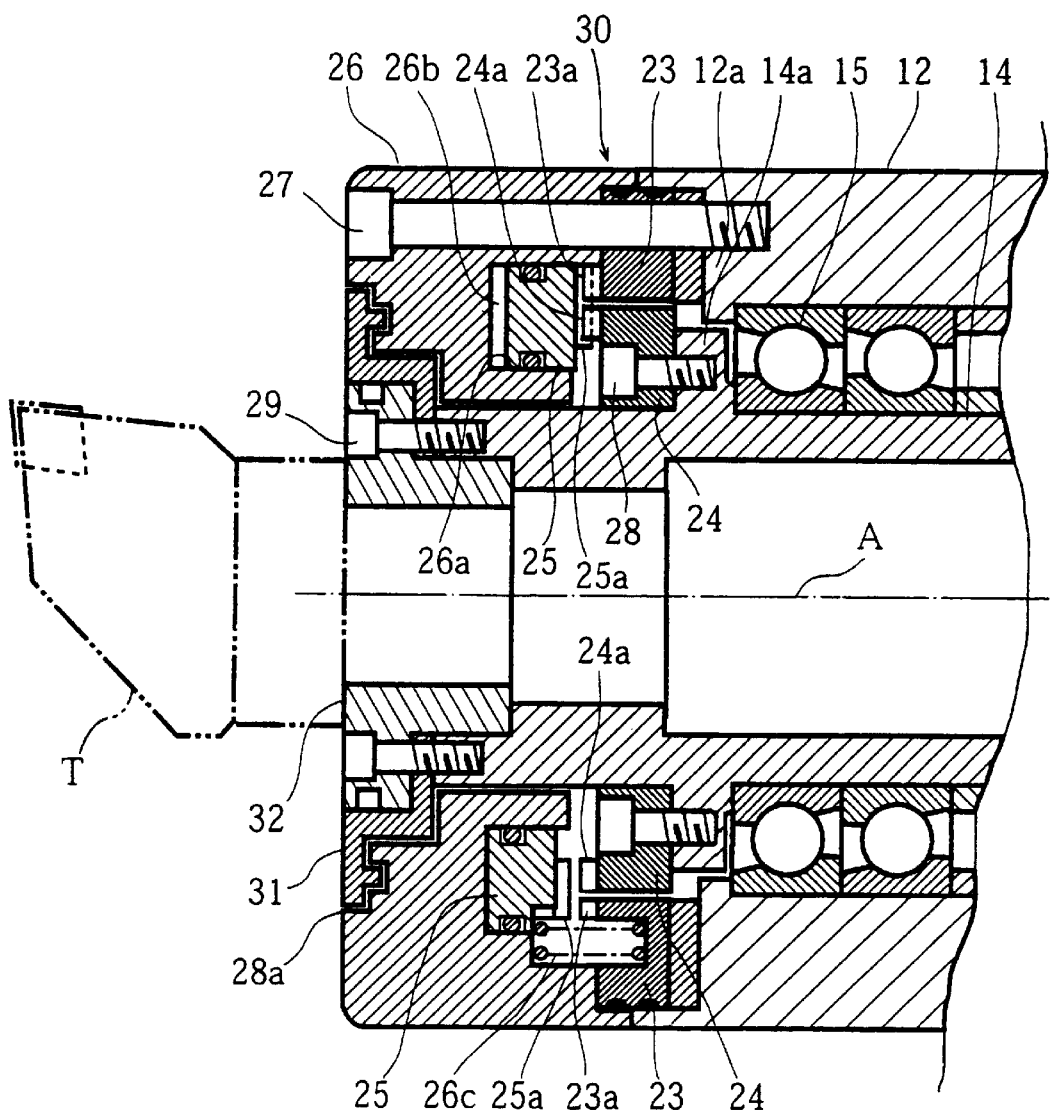
FIG. 4 is an enlarged sectional view of main part of the tool spindle fixing device.

FIGS. 1 through 4 are views for explaining a tool spindle fixing device of a composite lathe according to an embodiment of the present invention. FIGS. 1 and 2 are a perspective view and a left side view, respectively, of the composite lathe. FIG. 3 is a sectional side view of the tool spindle fixing device and FIG. 4 is an enlarged sectional view of a main part of the tool spindle fixing device.

Referring to the figures, reference numeral 1 denotes a composite lathe enabled to perform both turning process and rotating-tool process. The composite lathe 1 comprises a tailstock 3 which is right-and-left movably placed on the right side as viewed from the front of a bed 2, a headstock 4 fixedly placed on the left side, a carriage 5 which is right-and-left movably placed on the deep side, and a tool post 8 mounted on the carriage 5.

The headstock 4 is equipped with a chuck 6 for gripping a work and the chuck 6 is driven into rotation by a spindle motor. The tailstock 3 is equipped with a center 7 for holding the work in cooperation with the chuck 6. In addition, numeral 35 denotes a control panel.

The tool post 8 generally comprises a support plate 9 which is placed on a front-bowed tilted surface 5a of the carriage 5 so as to be movable obliquely back and forth, a pedestal 10 disposed on the support plate 9, and a tool post body 11 which is swingably supported by the pedestal 10. In addition, reference numeral 9a denotes a turn drive motor 9a for turning the tool post body 11 in the direction of arrow "a" in FIG. 1.

The tool post body 11 comprises a tool spindle 14 having a turning tool T or rotating tool removably fitted to the front end, a tool headstock 12 for rotatably supporting the tool spindle 14, and a spindle motor 13 which is mounted on the tool headstock 12 and which rotationally drives the tool spindle 14.

The tool spindle 14 is cylindrical shaped and coaxially inserted into the tool headstock 12, and rotatably supported by two sets of front ball bearings 15 and two sets of rear ball bearings 16. A tool attaching/detaching mechanism 17 is provided and inserted in the tool spindle 14. This tool attaching/detaching mechanism 17 is so constructed that a drawbar 18 is advanceably and retractably inserted into the tool spindle 14 and biased along the clamping direction by a biasing spring 19, and that the tool T is pulled rightward by an engaging piece 18a of a tip of the drawbar 18 so as to be clamped.

The tool spindle 14 is driven into rotation by the spindle motor 13 via a tool-spindle side pulley 20 fitted to a counter-tool side end portion, a drive belt 21 and a motor side pulley 13a.

Then, a 3-piece coupling type clamping mechanism 30 that characterizes this embodiment is provided at a tool-side end portion of the tool spindle 14. In addition, in FIG. 4, the part above the axial line A of the tool spindle shows a clamped state and the part below the same shows an unclamped state. The clamping mechanism 30 comprises a fixed-side coupling 23 fixed to a front end face 12a of the tool headstock 12 by a bolt 27 so as to be inhibited from rotating and axially moving, a rotating-side coupling 24 which is fixed to the front face of a fore flange portion 14a of the tool spindle 14 with a bolt 28 and which rotates together with the tool spindle 14, and a connection coupling 25 which is provided so as to face the two couplings 24, 23 and be axially movable.

The fixed-side coupling 23 and the rotating-side coupling 24 have numerous engaging teeth 23a, 24a formed radially with equal angular intervals on their respective annular platy front faces. The rotating-side coupling 24 is located within the fixed-side coupling 23, the two couplings 23, 24 and the tool spindle 14 are coaxial with one another, and end faces of the numerous engaging teeth 23a, 24a form the same plane.

The connection coupling 25 is shaped like an annular piston, and has engaging teeth 25a formed on its face opposed to both couplings 23, 24, the engaging teeth 25a being engageable with the engaging teeth 23a, 24a. This connection coupling 25 is advanceably and retractably inserted in a sliding hole 26a of a cylinder 26 and biased in the retracting direction by a biasing spring 26c.

The connection coupling 25 is moved rightward in the figure when operating oil is fed into an oil chamber 26b which is defined by the connection coupling 25 and the sliding hole 26a, so that its engaging teeth 25a are engaged with the engaging teeth 23a, 24a of the fixed-side, rotating-side couplings 23, 24, thus positioning the fixed-side, rotating-side couplings 23, 24 in the rotational direction with high accuracy and moreover coupling them together firmly. In addition, the cylinder 26 has a rear end face of its outer peripheral edge overlapped with the fixed-side coupling 23 and co-tightened and fixed to the front end face 12a of the tool headstock 12 with the bolt 27.

Further, a seal ring 31 and a tool holder 32 are co-tightened and fixed at the front end face of the tool spindle 14 with a bolt 29. Also, a labyrinth groove 28a for sealing is formed between the seal ring 31 and the cylinder 26.

At the counter-tool side end portion of the tool spindle 14, a positioning mechanism 22 for performing the axial positioning of the tool spindle 14 is provided. This positioning mechanism 22 is so designed to inhibit the tool spindle 14 from retreating, by the pressing force involved in the engagement of the connection coupling 25 with the rotating-side coupling 24, thereby ensuring the engagement between the connection coupling and the rotating-side, fixed-side couplings 24, 23, and thus securely clamping the tool spindle 14 to the tool headstock 12.

The positioning mechanism 22 is so constructed that a piston 22b is advanceably and retractably inserted into a cylinder 22a supported to the tool headstock 12 via a bracket. For turning process with the tool spindle 14 fixed, the piston 22b advances to the positioning position as shown in upper half of FIG. 3, so that the front end face of a piston rod (pressing member) 22c presses a rear end face of the tool spindle 14. Also, for rotating-tool process, the piston 22b retreats to the non-positioning position as shown in lower half of FIG. 3 so that the front end face of the piston rod 22c is separated from the rear end face of the tool spindle 14, allowing the tool spindle 14 to rotate.

Next functional effects of the tool spindle fixing device of this embodiment are described.

For performing rotating-tool process, an operating-oil return passage which communicates with the oil chamber 26b defined by the cylinder 26 and the end face of the connection coupling 25 is opened, and the connection coupling 25 is moved leftward in the figure by the biasing force of the biasing spring 26c, causing the engaging teeth 25a of the connection coupling 25 to be disengaged from the engaging teeth 23a, 24a of the two couplings 23, 24. As a result, the tool spindle 14 becomes rotatable with respect to the tool headstock 12 and is driven into rotation by the spindle motor 13, by which rotating-tool process such as boring and milling is carried out.

For the turning process, on the other hand, the return passage from the oil chamber 26b is closed while the oil feed passage is opened, and the connection coupling 25 is moved rightward in the figure, causing the engaging teeth 25a of the connection coupling 25 to be engaged with both the engaging teeth 23a of the fixed-side coupling 23 and the engaging teeth 24a of the rotating-side coupling 24. As a result, the tool spindle 14 is fixed to the tool headstock 12 so as to be nonrotatable.

In the positioning mechanism 22, the piston 22b is moved leftward in the figure, and the front end face of the piston rod 22c presses the rear end face of the tool spindle 14, so that the connection coupling 25 and the tool spindle 14 pinches the rotating-side coupling 24, with the result that the tool spindle 14 is securely fixed to the tool headstock 12. In this manner, the tool spindle 14 can be inhibited from retreating due to backlashes, elastic deformations and the like of the bearings 15, 16, by the axial pressing force involved in the engagement of the connection coupling 25 with the rotating-side coupling 24, or by cutting loads involved in during deep cutting process. In this state, the turning tool T fixed to the tool spindle 14 is applied to the cutting of the work that is gripped by the chuck of the headstock 4 and that is driven to rotate, by which the turning process is carried out.

As shown above, in this embodiment, the fixed-side coupling 23 is fixed to the tool headstock 12 while the rotating-side coupling 24 is fixed to the tool spindle 14, respectively, and the engaging teeth 25a of the connection coupling 25 are engaged with both the engaging teeth 23a, 24a of the two couplings 23, 24, by which the tool spindle 14 is fixed to the tool headstock 12. As a result, the numerous engaging teeth 23a, 24a of the fixed-side, rotating-side couplings 23, 24 are coupled together via the numerous engaging teeth 25a of the connection coupling 25. Thus, the clamping rigidity of the tool spindle 14 to the tool headstock 12 can be enhanced all the more for the coupling, and the positioning accuracy in the rotational direction can be improved.

Further, for clamping the tool spindle 14, the rear end face of the tool spindle 14 is pressed by the front end face of the piston rod 22c of the positioning mechanism 22. As a result, the rotating-side coupling 24 is pinched between the connection coupling 25 and the tool spindle 14, so that the tool spindle 14 can be securely fixed to the tool headstock 12. Thus, the tool spindle 14 can be inhibited from retreating due to backlashes, elastic deformations and the like of the bearings 15, 16, by the axial pressing force involved in the engagement of the connection coupling 25 with the rotating-side coupling 24, or by cutting loads involved in deep cutting process. Moreover, the finishing accuracy can be improved in the finishing process.

Furthermore, since the tool spindle 14 is pressed by the piston rod 22c, the axial pressing force from the connection coupling 25 can be prevented from acting on the bearings 15, 16 of the tool spindle 14. Thus, the bearings 15, 16 can be prevented from shortening in service life.

What is claimed is:

1. A tool spindle fixing device for composite machine tools in which a rotating-tool process is performed by one of driving a tool spindle in rotation with a rotating tool fitted to the tool spindle rotatably supported to a tool headstock and by driving a workpiece into turning with the tool spindle fixed to the tool headstock and with a turning tool fitted to the tool spindle, with comprises:

a fixed-side coupling having a plurality of engaging teeth, said rotating side coupling being fixed to the tool headstock;

a rotating-side coupling having a plurality of engaging teeth, said rotating side coupling being fixed to the tool spindle so that said rotating-side coupling is placed within the fixed-side coupling and is coaxial with the fixed-side coupling;

a connection coupling having a plurality of engaging teeth, said connection coupling including a device for advancing said connection coupling towards and retracting said connection coupling away from the fixed- and rotating-side couplings, wherein the engaging teeth of the connection coupling are engaged or disengaged with the engaging teeth of said fixed- and rotating-side couplings, by which the tool spindle is fixed or unfixed to the tool headstock; and a positioning mechanism for pressing, in the turning process, a counter-tool-side end face of the tool spindle by a pressing member so that the tool spindle is positioned axially, and for withdrawing, in the rotating tool process, the pressing member so that the pressing member is separated from the end face.

2. The tool spindle fixing device for composite machine tools according to claim 1, which comprises a biasing spring for biasing the connection coupling in a retracting direction, said biasing spring being inserted between a hole formed through both the connection coupling and the cylinder and a hole formed in the fixed-side coupling.

* * * * *